United States Patent
Koyama

(10) Patent No.: US 10,552,713 B2
(45) Date of Patent: Feb. 4, 2020

(54) IMAGE ANALYSIS SYSTEM, IMAGE ANALYSIS METHOD, AND STORAGE MEDIUM

(71) Applicant: NEC Corporation, Tokyo (JP)

(72) Inventor: Kazuya Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 15/307,600

(22) PCT Filed: Feb. 5, 2015

(86) PCT No.: PCT/JP2015/000528
§ 371 (c)(1),
(2) Date: Oct. 28, 2016

(87) PCT Pub. No.: WO2015/166612
PCT Pub. Date: Nov. 5, 2015

(65) Prior Publication Data
US 2017/0053191 A1  Feb. 23, 2017

(30) Foreign Application Priority Data

Apr. 28, 2014 (JP) .................................. 2014-092401

(51) Int. Cl.
*G06K 9/62* (2006.01)
*G06K 9/00* (2006.01)

(52) U.S. Cl.
CPC ....... *G06K 9/6267* (2013.01); *G06K 9/00771* (2013.01)

(58) Field of Classification Search
CPC ............. G06K 9/6267; G06K 9/00771; G06K 9/00288; G06K 9/00228; G06K 9/00295;
(Continued)

(56) References Cited

U.S. PATENT DOCUMENTS 7,579,965 B2 *  8/2009  Bucholz ................. G08G 1/017
                                                    340/933
7,825,954 B2 * 11/2010  Zhang .................... G01S 3/7864
                                                    348/169
(Continued)

FOREIGN PATENT DOCUMENTS

JP   2003-143593   5/2003
JP   2007-219948   8/2007
(Continued)

OTHER PUBLICATIONS

International Search Report and Written Opinion dated Apr. 28, 2015, in corresponding PCT International Application.

*Primary Examiner* — Michael S Osinski
(74) *Attorney, Agent, or Firm* — Finnegan, Henderson, Farabow, Garrett & Dunner, L.L.P.

(57) ABSTRACT

A monitor target shooting information generation unit extracts, from each of a plurality of images, as information to be used for estimating the identify of a monitor target, monitor target identification information that is identification information of the monitor target, and the monitor target shooting information generation unit then generates multiple pieces of monitor target shooting information each including both the extracted monitor target identification information and a shooting time at which the monitor target was shot. An appearance history generation unit generates, from the generated multiple pieces of monitor target shooting information, an appearance history of the monitor target that has been estimated to be identical. A determination unit determines the monitor target the appearance history of which matches a specified rule.

11 Claims, 15 Drawing Sheets

(58) Field of Classification Search
CPC ..... G06K 9/00677; G06K 2009/00738; G06K 2009/00328; G06T 2207/30196; G06T 2207/30232; G06T 7/292; H04N 7/181; G06F 16/7837; G06F 16/58; G06F 16/583; G06F 16/784
See application file for complete search history.

(56) References Cited

U.S. PATENT DOCUMENTS

| | | | | |
|---|---|---|---|---|
| 7,929,017 | B2* | 4/2011 | Aggarwal | G01S 3/7864 |
| | | | | 348/169 |
| 8,460,220 | B2* | 6/2013 | Cuddihy | A61B 5/112 |
| | | | | 600/595 |
| 9,111,143 | B2* | 8/2015 | Meredith | G06K 9/00577 |
| 9,158,975 | B2* | 10/2015 | Lipton | G06K 9/00771 |
| 9,189,683 | B2* | 11/2015 | Moriyama | G06K 9/00228 |
| 9,251,599 | B2* | 2/2016 | Hirasawa | G06T 7/2093 |
| 9,405,494 | B2* | 8/2016 | Tomioka | G06F 3/125 |
| 9,807,338 | B2* | 10/2017 | Cho | H04N 5/77 |
| 9,922,514 | B2* | 3/2018 | Gagvani | G08B 13/19615 |
| 9,934,447 | B2* | 4/2018 | Kant | G06K 9/4604 |
| 2004/0263621 | A1* | 12/2004 | Guo | G08B 13/19663 |
| | | | | 348/143 |
| 2005/0146605 | A1* | 7/2005 | Lipton | G06F 17/3079 |
| | | | | 348/143 |
| 2005/0162515 | A1* | 7/2005 | Venetianer | G06F 17/3079 |
| | | | | 348/143 |
| 2005/0169367 | A1* | 8/2005 | Venetianer | G06F 17/30799 |
| | | | | 375/240.01 |
| 2006/0072010 | A1* | 4/2006 | Haering | G06K 9/00771 |
| | | | | 348/143 |
| 2006/0109341 | A1* | 5/2006 | Evans | G06K 9/00771 |
| | | | | 348/14.08 |
| 2006/0291695 | A1* | 12/2006 | Lipton | G06K 9/00771 |
| | | | | 382/103 |
| 2007/0013776 | A1* | 1/2007 | Venetianer | G06K 9/00771 |
| | | | | 348/143 |
| 2007/0127774 | A1* | 6/2007 | Zhang | G06K 9/00771 |
| | | | | 382/103 |
| 2007/0208681 | A1* | 9/2007 | Bucholz | G08G 1/017 |
| | | | | 706/47 |
| 2007/0294207 | A1* | 12/2007 | Brown | G06F 17/30793 |
| 2008/0018738 | A1* | 1/2008 | Lipton | G06K 9/00771 |
| | | | | 348/143 |
| 2008/0074496 | A1* | 3/2008 | Venetianer | G06K 9/00335 |
| | | | | 348/150 |
| 2008/0101652 | A1* | 5/2008 | Zhao | G06K 9/00369 |
| | | | | 382/103 |
| 2008/0158361 | A1* | 7/2008 | Itoh | G08B 13/19602 |
| | | | | 348/155 |
| 2008/0247601 | A1* | 10/2008 | Ito | G06K 9/00771 |
| | | | | 382/103 |
| 2009/0002489 | A1* | 1/2009 | Yang | G06K 9/00771 |
| | | | | 348/143 |
| 2009/0022362 | A1* | 1/2009 | Gagvani | G08B 13/19615 |
| | | | | 382/100 |
| 2009/0041297 | A1* | 2/2009 | Zhang | G06K 9/00362 |
| | | | | 382/103 |
| 2009/0131836 | A1 | 5/2009 | Enohara et al. | |
| 2009/0231458 | A1* | 9/2009 | Moriyama | G06K 9/00228 |
| | | | | 348/222.1 |
| 2009/0304230 | A1* | 12/2009 | Krahnstoever | G06T 7/292 |
| | | | | 382/103 |
| 2010/0299021 | A1* | 11/2010 | Jalili | G07C 5/085 |
| | | | | 701/33.4 |
| 2011/0199486 | A1* | 8/2011 | Moriya | G06Q 30/02 |
| | | | | 348/150 |
| 2012/0321138 | A1 | 12/2012 | Enohara et al. | |
| 2013/0039547 | A1* | 2/2013 | Liu | G06K 9/00288 |
| | | | | 382/115 |
| 2013/0050502 | A1* | 2/2013 | Saito | G06T 7/20 |
| | | | | 348/169 |
| 2013/0266190 | A1* | 10/2013 | Wang | G06K 9/3258 |
| | | | | 382/105 |
| 2014/0009793 | A1* | 1/2014 | Tomioka | G06F 3/125 |
| | | | | 358/1.15 |
| 2014/0050455 | A1* | 2/2014 | Ni | H04N 9/8227 |
| | | | | 386/224 |
| 2014/0078304 | A1* | 3/2014 | Othmer | G08G 1/20 |
| | | | | 348/148 |
| 2014/0347475 | A1* | 11/2014 | Divakaran | G06K 9/00771 |
| | | | | 348/135 |
| 2015/0032580 | A1* | 1/2015 | Altermatt | G06Q 30/0645 |
| | | | | 705/28 |
| 2015/0092979 | A1* | 4/2015 | Meredith | G06K 9/00577 |
| | | | | 382/103 |
| 2015/0371403 | A1* | 12/2015 | Koyama | G06T 7/2093 |
| | | | | 382/103 |
| 2016/0295157 | A1* | 10/2016 | Cho | G06F 17/30268 |
| 2016/0321831 | A1* | 11/2016 | Nakamura | G06T 11/60 |

FOREIGN PATENT DOCUMENTS

| | | |
|---|---|---|
| JP | 2008-252519 | 10/2008 |
| JP | 2010-238184 | 10/2010 |
| JP | 2010-272948 | 12/2010 |
| JP | 2012-238111 | 12/2012 |
| JP | 2013-8298 | 1/2013 |
| JP | 2013-88870 | 5/2013 |
| JP | 2013-131153 | 7/2013 |
| WO | WO 2014/045843 A1 | 3/2014 |

* cited by examiner

Fig. 2

| PERSON ID | REPRESENTATIVE IMAGE | PERSON IMAGE ID | PERSON IDENTIFICATION INFORMATION | IMAGE CAPTURE TIME | CAMERA NAME | ACCURACY OF IDENTIFICATION |
|---|---|---|---|---|---|---|
| A | | | | | | |
| B | | | | | | |

Fig. 3

| RULE DESCRIPTION | RULE NAME |
|---|---|
|  |  |
|  |  |

Fig. 4

| PERSON IMAGE ID | IMAGE CAPTURE TIME | CAMERA NAME |
|---|---|---|
|  |  |  |
|  |  |  |

Fig. 8

| PERSON IMAGE ID | PERSON IDENTIFICATION INFORMATION | IMAGE CAPTURE TIME | CAMERA NAME |
|---|---|---|---|
|  |  |  |  |
|  |  |  |  |

Fig. 11

| TIME AND DATE | LOCATION |
|---|---|
|  |  |
|  |  |

Fig. 15

| PERSON ID | RELATED PERSON ID LIST |
|---|---|
| A | B, D |
| B | A |
| C | D |

IMAGE ANALYSIS SYSTEM, IMAGE ANALYSIS METHOD, AND STORAGE MEDIUM

CROSS-REFERENCE TO RELATED PATENT APPLICATIONS

This application is a National Stage Entry of International Application No. PCT/JP2015/000528, filed Feb. 5, 2015, which claims priority from Japanese Patent Application No. 2014-092401, filed Apr. 28, 2014. The entire contents of the above-referenced applications are expressly incorporated herein by reference.

TECHNICAL FIELD

The present invention relates to an image analysis system, an image analysis method, and an image analysis program for analyzing a monitored subject in images.

BACKGROUND ART

It is common practice to install surveillance cameras in locations such as railroad stations and particular facilities and to analyze images captured with the surveillance cameras to perform various kinds of determination. As one example, a person or an object that stays in a surveillance area for an unusually long period is identified as a suspicious person or a suspicious object.

A known related technique is a behavior analysis method that tracks a specific person and analyzes behavior of the person. In the behavior analysis, for example, one camera or multiple cameras whose coverage areas overlap one another are used to recognize the location of a specific person and changes in the location of the person with time are tracked, thereby identifying where and how long the person stayed.

A person recognition method is also known that performs face matching in order to recognize a specific person in a captured image. PTL 1 describes a facial image recognition apparatus that is intended to speed up facial image recognition processing and to simplify registration work. In the facial image recognition apparatus described in PTL 1, a full-face facial image and a non-full-faced average facial image of a person to be recognized are registered in advance and features of a facial area extracted from an image is compared with the registered facial images to recognize a facial image in the image.

PTL 2 describes a suspicious person detecting apparatus that automatically detects a suspicious person from a camera image. The apparatus described in PTL 2 periodically captures images with cameras capable of taking images of surroundings of a vehicle in all directions, calculates quantities of features of behavior of an extracted person at predetermined intervals, and determines, from the frequency distribution of the quantities of features of behavior, whether the person is a suspicious person.

PTL 3 describes an image processing apparatus that associates objects in an image with one another. In the apparatus described in PTL 3, an evaluation means evaluates an object detected by an object detection means. Then a relation evaluation means evaluates other objects associated with the object evaluated by the evaluation means based on the evaluation. In this way, a second object associated with a first object is evaluated based on the evaluation of the first object.

CITATION LIST

Patent Literature

[PTL 1] Japanese Laid-open Patent Publication No. 2012-238111

[PTL 2] Japanese Laid-open Patent Publication No. 2013-88870

[PTL 3] Japanese Laid-open Patent Publication No. 2008-252519

SUMMARY OF INVENTION

Technical Problem

In the behavior analysis method described above, the area in which behavior of a person can be analyzed depends on the coverage area of a camera. For example, if a single camera is used, the area in which behavior of a person can be analyzed is limited to the coverage area of the camera. To cover a wider area, many cameras need to be used so that there are no blind spots in the monitored area. Furthermore, fully tracking a specific person under crowded image capture conditions is difficult since other people can frequently block a camera's view of the specific person.

When the facial image recognition apparatus described in PTL 1 is used, information about a suspicious person to be detected needs to be provided in advance. In other words, the facial image recognition apparatus described in PTL 1 may not be used in a situation where it is unknown who is suspicious in the first place.

The suspicious person detection apparatus described in PTL 2 is based on the assumption that images that are continuous in time within the coverage area of cameras are used. This is because the quantities of features of behavior used by the suspicious person detection apparatus described in PTL 2 are information that can be obtained from continuous images, such as movement speed, the amount of change in a direction of movement, distance to the vehicle, and the vertical position of the head of a person. Accordingly, in a situation where the area in which images are to be taken cannot be covered, such as when an area to be monitored is wide, it is difficult to detect a suspicious person by using the suspicious person detection apparatus described in PTL 2.

Therefore, an object of the present invention is to provide an image analysis system, an image analysis method, and an image analysis program that are capable of analyzing a monitored subject displaying suspicious behavior from captured image even when an area to be monitored is wide or even when the monitored subject to be detected is not registered in advance.

Solution to Problem

An image analysis system of the present invention includes:

a subject-image-capture-information generation unit that extracts subject-identification-information which is identification information of a monitored subject as information used for inferring identity of the monitored subject from each image and generating subject-image-capture-information including the extracted subject-identification-information and an image capture time in which the image of the monitored subject is captured;

an appearance record generation unit that generates an appearance record of the monitored subject inferred to be identical from a plurality of the subject-image-capture-information; and an identification unit that identifies the monitored subject that has an appearance record that matches a defined rule.

An image analysis method of the present invention includes:

extracting subject-identification-information which is identification information of a monitored subject as information used for inferring identity of the monitored subject from each image and generating subject-image-capture-information including the extracted subject-identification-information and an image capture time in which the image of the monitored subject is captured;

generating an appearance record of the monitored subject inferred to be identical from a plurality of the subject-image-capture-information;

and identifying the monitored subject that has the appearance record that matches a defined rule.

An image analysis program causing a computer to execute:

extracting subject-identification-information which is identification information of a monitored subject as information used for inferring identity of the monitored subject from each image and generating subject-image-capture-information including the extracted subject-identification-information and an image capture time in which the image of the monitored subject is captured;

generating an appearance record of the monitored subject inferred to be identical from a plurality of the subject-image-capture-information; and identifying the monitored subject that has the appearance record that matches a defined rule.

Advantageous Effects of Invention

According to the present invention, a monitored subject that is displaying suspicious behavior can be analyzed from captured image even when an area to be monitored is wide or even when the monitored subject to be detected is not registered in advance.

BRIEF DESCRIPTION OF DRAWINGS

FIG. 2 is a diagram illustrating an example of information stored in an appearance record storage unit 22.

FIG. 3 is a diagram illustrating an example of rules stored in a rule storage unit 24.

FIG. 4 is a diagram illustrating an example of information stored in an output result storage unit 20.

FIG. 8 is a diagram illustrating an example of information stored in a person-identification-information storage unit 18.

FIG. 11 illustrates an example of information stored in an event storage unit 29.

FIG. 15 is a diagram illustrating an example of information stored in a person relation storage unit 34.

DESCRIPTION OF EMBODIMENTS

Example embodiments of the present invention will be described below with reference to the drawings. In the following description, an example is given in which processing is performed for monitoring a person. However, a monitored subject is not limited to a person but may be an object such as a vehicle, for example.

First Example Embodiment

Figure 1:
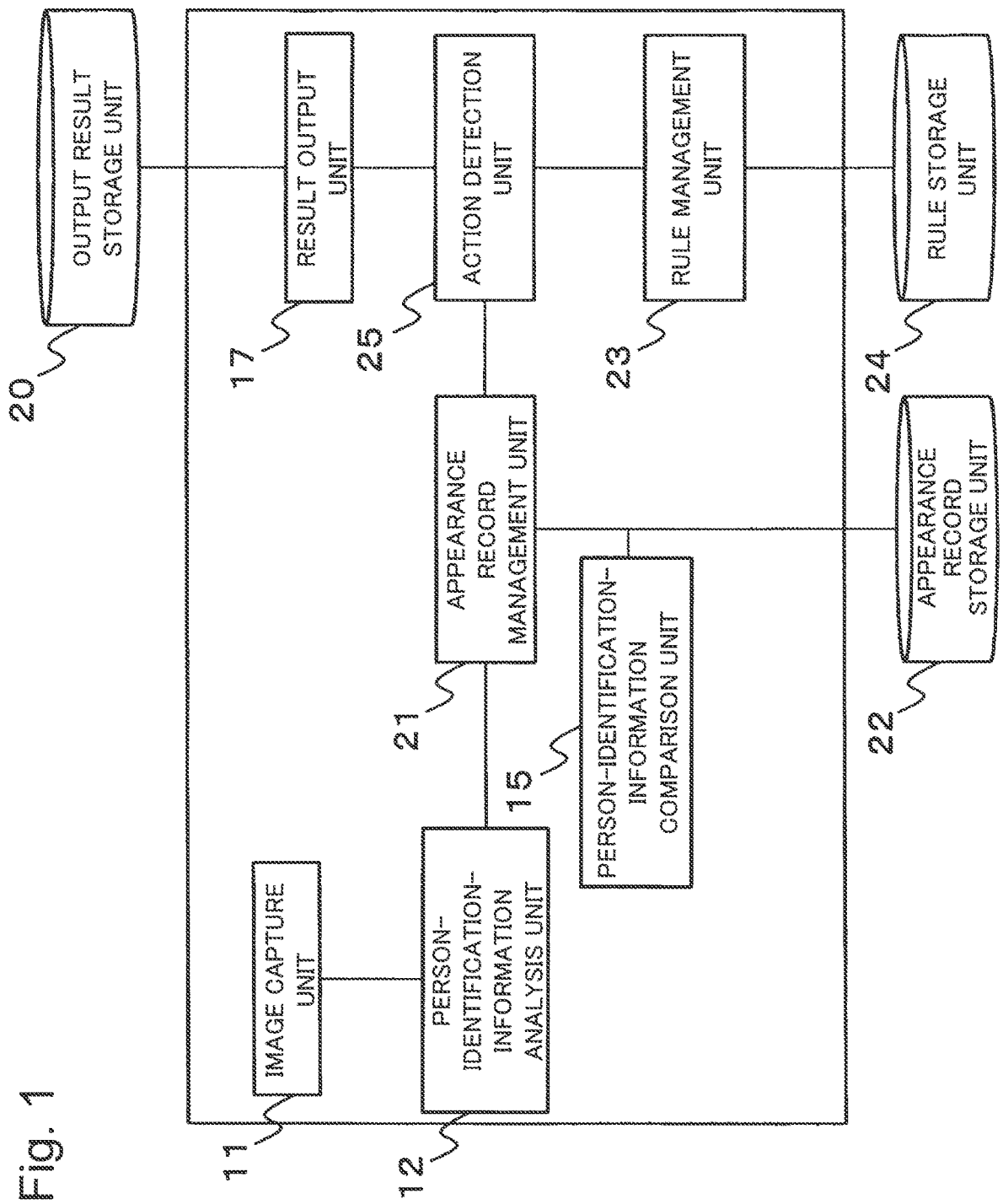
FIG. 1 is a block diagram illustrating a configuration of a first example embodiment of an image analysis system according to the present invention.

FIG. 1 is a block diagram illustrating a configuration of a first example embodiment of an image analysis system according to the present invention. The image analysis system of the present example embodiment includes an image capture unit 11, a person-identification-information analysis unit 12, a person-identification-information comparison unit 15, an appearance record management unit 21, an appearance record storage unit 22, a rule management unit 23, a rule storage unit 24, a behavior detection unit 25 and a result output unit 17. The image analysis system may be connected to an output result storage unit 20 that stores output results.

The image capture unit 11 captures an image of a predetermined monitoring area. The image capture unit 11 also captures the time at which the image is captured (hereinafter referred to as a time of image capture) together with the image. The image capture unit 11 inputs the image of the monitored area and the time at which the image is captured (i.e. the time of image capture) into the person-identification-information analysis unit 12. The image capture unit 11 may be implemented by an image capture device such as a camera, for example.

Note that while the image analysis system illustrated in FIG. 1 includes only one image capture unit 11, the number of image capture unit 11 is not limited to one, but there may be two or more units 11. Further, the coverage areas of the image capture units 11 may overlap one another or may not overlap at all. If the image analysis system includes a plurality of image capture units 11, each of the image capture units 11 may input information that identifies the image capture unit 11 (hereinafter referred to as image-capture-device identification information) into the person-identification-information analysis unit 12 along with the captured images.

The image capture unit 11 is preferably installed in a facility to be monitored so that the image capture unit 11 can capture the image of an area to be watched especially closely. However, the image capture unit 11 does not need to be installed to capture images of the entire area of the facility.

The image captured in the present example embodiment are not limited to image that are continuous in time. In other words, the image used in analysis in the present example embodiment may be a set of images (video images) that are discontinuous in time. Note that the image that are discontinuous in time include not only the image obtained by appropriately eliminating some frames from the image normally captured but also the image captured in different time periods or different locations. In other words, the captured image may be continuous or discontinuous in time and the image may be captured in any locations in the present example embodiment as long as the time and locations at which the image is captured can be identified.

Further, the image analysis system may include an image storage unit (not depicted) that holds the image captured by the image capture unit 11 for a certain period. The image storage unit is implemented by a magnetic disk or the like. Provision of such a storage unit enables use of the image captured in the past.

The person-identification-information analysis unit 12 analyzes a monitored subject appearing in the image captured by each image capture unit 11. Specifically, when the person-identification-information analysis unit 12 detects the monitored subject in the image, the person-identification-information analysis unit 12 generates information (hereinafter referred to as subject-image-capture-information) including identification information of the monitored subject (hereinafter referred to as subject-identification-information) and the time at which the image of the monitored subject is captured. The subject-identification-information is used for inferring the identity of the monitored subject. The person-identification-information analysis unit 12 may generate subject-image-capture-information including the image capture location in which the image of the subject is captured. The image capture location may be the location of the camera itself or identification information of the camera (image-capture-device identification information) or a coverage area of the camera.

Subject-identification-information extracted by the person-identification-information analysis unit 12 is predetermined in accordance with the monitored subject. For example, if the monitored subject is a person, the person-identification-information analysis unit 12 may extract a facial image of the person as subject-identification-information when the person is detected in the image. Alternatively, if the monitored subject is a vehicle, for example, the person-identification-information analysis unit 12 may extract an image of the license plate of the vehicle as subject-identification-information when the person-identification-information analysis unit 12 detects the vehicle in the image.

However, information extracted by the person-identification-information analysis unit 12 is not limited to the facial image and license plate image. Any information may be extracted that allows the monitored subject to be identified. Subject-identification-information used for identifying a person can be referred to as person identification information. Note that methods for extracting a particular piece of identification information from an image of interest are widely known and therefore, detailed description of the methods will be omitted.

When explicit image-capture-device identification information is not sent from each image capture unit 11, the person-identification-information analysis unit 12 may assign image-capture-device identification information to the image in accordance with the image capture unit 11 that has input the image upon input of the image from the image capture unit 11.

The appearance record management unit 21 generates an appearance record of the monitored subject that is inferred to be the same from subject-image-capture-information extracted by the person information analysis unit 12. Specifically, the appearance record management unit 21 generates the record of the monitored subject that is inferred to be the same as a subject appearing in an image captured by the image capture unit 11 as the appearance record and stores the record in the appearance record storage unit 22. Processing for inferring the identity of the monitored subject is performed by the person-identification-information comparison unit 15, which will be described later.

The appearance record storage unit 22 stores the appearance record of the monitored subject. Specifically, the appearance record storage unit 22 stores, for each the monitored subject, the appearance record in which items of information, including a time of image capture, are associated with the monitored subject. The time of image capture can be referred to as the time of appearance of the monitored subject. FIG. 2 is a diagram illustrating an example of information stored in the appearance record storage unit 22 of the present example embodiment.

In the example illustrated in FIG. 2, the appearance record storage unit 22 associates and stores, for each person ID for identifying the monitored subject, a person image ID, which is an identifier identifying subject-image-capture-information, person identification information representing the subject-identification-information, the time of image capture, and the name of the camera that captured the image (for example image-capture-device identification information).

In order to store the appearance records illustrated in FIG. 2, the appearance record storage unit 22 may generate the appearance record including an image capture location. Note that since the camera name or the image-capture-device identification information, which is set for the image capture location, is information indicating the location where the monitored subject appeared, the camera name or the image-capture-device identification information can be referred to as the appearance location.

As illustrated in FIG. 2, the appearance record storage unit 22 may store the certainty of the monitored subject (identification accuracy) inferred from the captured image and information that indicates that the image is used for comparison as a representative of the person identification information of the monitored subject inferred to be the same (a representative image) in association with the person ID. The representative image is preferably an image with a higher level of accuracy that is selected from person identification information indicating the same monitored person.

The person identification comparison unit 15 compares the subject-identification-information and identifies the monitored subject inferred to be the same. For example, when the facial image of the subject has been extracted as the subject-identification-information, the person-identification-information comparison unit 15 may identify a person inferred to be the same.

Specifically, the person-identification-information comparison unit compares the subject-identification-information extracted by the person-identification-information analysis unit 12 with the subject-identification-information stored in the appearance record storage unit 22 to determine whether the same monitored subject is registered in the appearance record storage unit 22.

If it is determined that the same monitored subject is already registered in the appearance record storage unit 22, the appearance record management unit 21 adds the subject-identification-information extracted by the person-identification-information analysis unit 12 to the appearance record of the monitored subject. On the other hand, when it is determined that the same monitored subject is not registered in the appearance record storage 22, the appearance record management unit 21 generates the appearance record for the subject as a new monitored subject.

For example, when the monitored subject is a person, the person-identification-information analysis unit 12 extracts the facial image as the subject-identification-information (person identification information). When the person-identification-information analysis unit 12 generates person identification information, the person-identification-information comparison unit 15 compares the generated person identification information with the person identification information stored in the appearance record storage unit 22 to determine whether there is the same person. Specifically, the person-identification-information comparison unit 15 compares the facial information included in the generated subject-image-capture-information to determine whether the monitored subject is the same person.

When it is inferred that the subject is the same person, the appearance record management unit 21 uses the person ID of the person to add the appearance record. On the other hand, when it is determined that the same person does not exist, the appearance record management unit 21 generates a new person ID and adds the appearance record.

Furthermore, when the person-identification-information comparison unit 15 compares the subject-identification-information, the person-identification-information comparison unit 15 may calculate the certainty of the monitored subject inferred to be the same person (the accuracy of identification). Then, the appearance record management unit 21 may register the appearance record including the certainty into the appearance record storage unit 22.

The person-identification-information comparison unit 15 may compare the subject-identification-information with only the representative image illustrated in FIG. 2 in the subject-identification-information included in the appearance record of each person. By determining such the representative image in advance, the number of comparisons can be reduced to speed up the processing while increasing the level of accuracy of comparison with new subject-image-capture-information.

Methods for comparing the images to determine whether the images match and for calculating the certainty that the images match are widely known and therefore, further description will be omitted.

The rule storage unit 24 stores rules defining patterns of behavior of monitored subjects to be extracted. As in the present example embodiment, in order to extract the monitored subject who is displaying suspicious behavior, the rule storage unit 24 stores a pattern of suspicious behavior identified from the appearance records as rules.

FIG. 3 is a diagram illustrating an example of rules stored in the rule storage unit 24. In the example illustrated in FIG. 3, the rule storage unit 24 stores rule descriptions representing patterns of behavior of monitored subjects to be extracted in association with rule names for identifying rules.

Examples of rules to be defined will be described below. The monitored subject who is making a movement deviating from normal movements of people who use a facility can be determined to be the monitored subject displaying suspicious behavior. Rules illustrated below can therefore be defined.

A first rule is that "a person appears in a certain number of different areas or more in a given period".

For example, assume that there is a stadium with four areas: a north stand area, a south stand area, an east stand area, and west stand area. An ordinary spectator would appear in one area where his/her seat exists. While some spectators may move to adjacent areas and thus appear in two areas, appearances of a spectator in three areas can be a suspicious behavior.

Therefore, defining a rule, for example, that "a person has records of appearances in a predetermined number of different image capture locations within a predetermined period" allows identification of the monitored subject that matches the first rule.

A second rule is that "within a predetermined period, a person appears in two or more particular locations a predetermined number of times or more with a different location between the locations".

For example, assume that there are plazas A and B distant from one another. A person having an observed appearance record "A, A" can be determined to be just strolling in plaza A. A person having an observed appearance record "A, A, B, B" can be determined to have moved from plaza A to plaza B. On the other hand, a person having an observed appearance record "A, B, A, B, A, B" can be determined to be moving unnaturally between plaza A and plaza B, which can be a suspicious behavior.

Therefore, defining a rule, for example, that "a person having the appearance record of alternate appearances in two or more different image capture locations in a predetermined period" in the rule storage unit 24, allows identification of the monitored subject that matches the second rule.

A third rule is that "a predetermined number of times or more of a case is observed where a person appears in a specified location but does not appear in another location associated with the location within a predetermined period".

For example, it is normal that a person who has passed through the entrance of a store appears usually within about one hour at a checkout counter, which is a location the person has to go in order to achieve his/her intended purpose. Further, it is normal that a person who has passed through the entrance of a bank appears usually within about one hour at a bank counter, which is a location the person has to go in order to achieve his/her intended purpose. While some people who enter a facility may not use the facility, it is a suspicious behavior when a person did not appear in a location the person has to go in order to achieve his/her intended purpose even though the person repeatedly entered a facility in the morning and night or on different days.

Therefore, a rule is defined, for example, that "a person does not have the appearance record indicating an image capture location where the person is expected to appear based on a given image capture location within a certain period after the appearance record indicating the given image capture location", in the rule storage unit 24 allowing identification of the monitored subject that matches the third rule.

A fourth rule is that "a person repeatedly appears during a time of day in which usually people do not repeatedly appear."

For example, during a time of day in which many people meet up at a station, a person is possibly just searching for someone or trying to while away the time and therefore, it is not a suspicious behavior if the person repeatedly appears. However, repeated appearances of a person during a time of day such as a rush hour, early morning or late at night can be a suspicious behavior.

Therefore, a rule is defined, for example, that "a person has the appearance record of a predetermined number of appearances or more in a predetermined time period" in the rule storage unit 24 allowing identification of the monitored subject that matches the fourth rule.

As illustrated by the four example rules given above, rules specified by the relationships between two or more appearance records including image capture location and the image capture time are stored in the rule storage unit 24. The behavior detection unit 25 identifies the monitored subject that has the generated appearance record that matches any of the rules. Note that the rules include a relationship in which a second appearance record does not exist as illustrated by the third rule. Rules defined are not limited to the four rules described above.

The rule management unit 23 manages the rules stored in the rule storage unit 24. For example, the rule management unit 23 returns the rule stored in the rule storage unit 24, adds the rule to the rule storage unit 24 and updates the rule stored in the rule storage unit 24 in response to a request to access the rule storage unit 24.

The behavior detection unit 25 identifies the monitored subject that has the appearance record that matches a defined rule. Specifically, the behavior detection unit 25 compares a pattern that can be identified from appearance records stored in the appearance record storage unit 22 with the rules stored in the rule storage unit 24 and identifies the monitored subject that has the appearance record of the pattern that matches the rule.

The behavior detection unit 25 may operate when a new appearance record is registered in the appearance record storage unit 22 or may operate at regular intervals like batch processing.

The result output unit 17 outputs the monitored subject identified by the behavior detection unit 25. The result output unit 17 may store output results in the output result storage unit 20. FIG. 4 is a diagram illustrating an example of information stored in the output result storage unit 20. As illustrated in FIG. 4, the result output unit 17 may output the person image ID identifying an image of a person, a time of capture of the image of the person, and the camera with which the image is captured. Alternatively, the result output unit 17 may output only a person image ID.

The person-identification-information analysis unit 12, the person-identification-information comparison unit 15, the appearance record management unit 21, the rule management unit 23, the behavior detection unit 25, and the result output unit 17 are implemented by a CPU of a computer, for example, that operates in accordance with a program (an image analysis program). For example, the program may be stored in a storage device (not depicted) included in the image analysis system, the CPU may read the program and in accordance with the program, may operate as the person-identification-information analysis unit 12, the person-identification-information comparison unit 15, the appearance record management unit 21, the rule management unit 23, the behavior detection unit 25, and the result output unit 17.

Alternatively, each of the person-identification-information analysis unit 12, the person-identification-information comparison unit 15, the appearance record management unit 21, the rule management unit 23, the behavior detection unit 25, and the result output unit 17 may be implemented by a dedicated piece of hardware. The appearance record storage unit 22 and the rule storage unit 24 are implemented by a magnetic disk or the like, for example.

Figure 5:
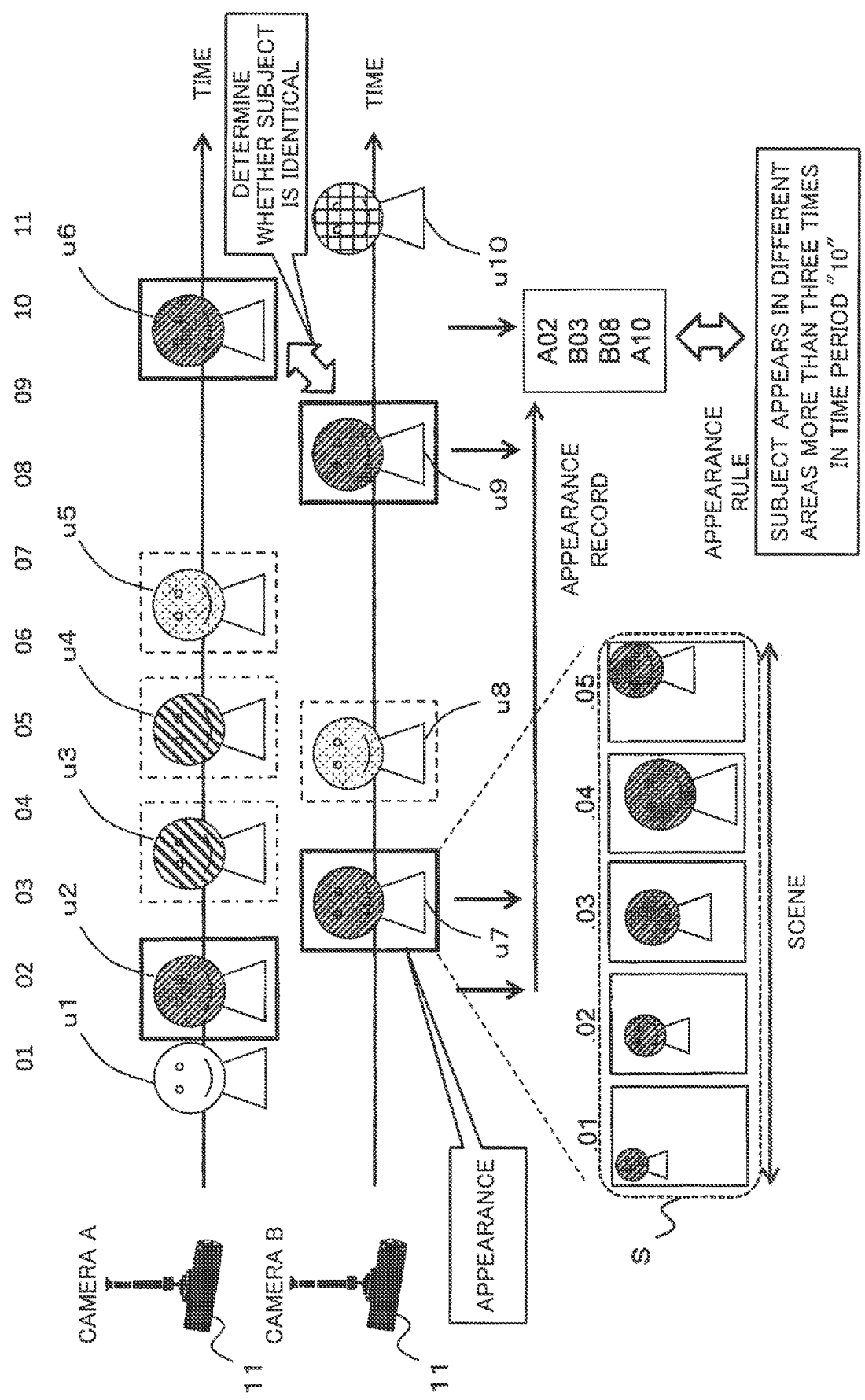
FIG. 5 is a diagram illustrating an exemplary operation of the image analysis system of the first example embodiment.

An operation of the image analysis system of the present example embodiment will be described next. FIG. 5 is a diagram illustrating an example operation of the image analysis system of the present example embodiment. In the example illustrated in FIG. 5, persons u1 to u10 who are the monitored subjects are depicted as being identified along the time axis from the images captured with two cameras A and B, which are equivalent to the image capture units 11.

Note that usually a person whose image is captured appears in a plurality of continuous frames S as illustrated in FIG. 5. Accordingly, the appearance of the person identified continuously from frames in a given period is counted as one.

In the example illustrated in FIG. 5, person u2, person u6, person u7 and person u9 are inferred to be the same person. When the person is denoted by P1, four records of person P1 are generated. For simplicity of explanation of appearance record, the appearance record is denoted by a symbol that is a combination of a symbol indicating a camera that captured the image and the time at which the image is captured. In the case of person P1, appearance records are A02, B03, B08 and A10. The appearance records of person P1 are illustrated in FIG. 5.

Similarly, in the example in FIG. 5, person u2 and person u6 are inferred to be the same person. When the person is denoted by P2, two appearance records (A03, A05) are created for person P2. Further, person u5 and person u8 are inferred to be the same person. When the person is denoted by P3, two appearance records (B05, A06) are created for person P3.

It is assumed here that a rule that "a person appears three times or more in different areas within a period '10'" is defined. The person that has the appearance record that matches the rule is person P1. Accordingly, the behavior detection unit 25 identifies P1 as the monitored subject that matches the rule and the result output unit 17 outputs items of information required for identifying the monitored subject.

Figure 6:
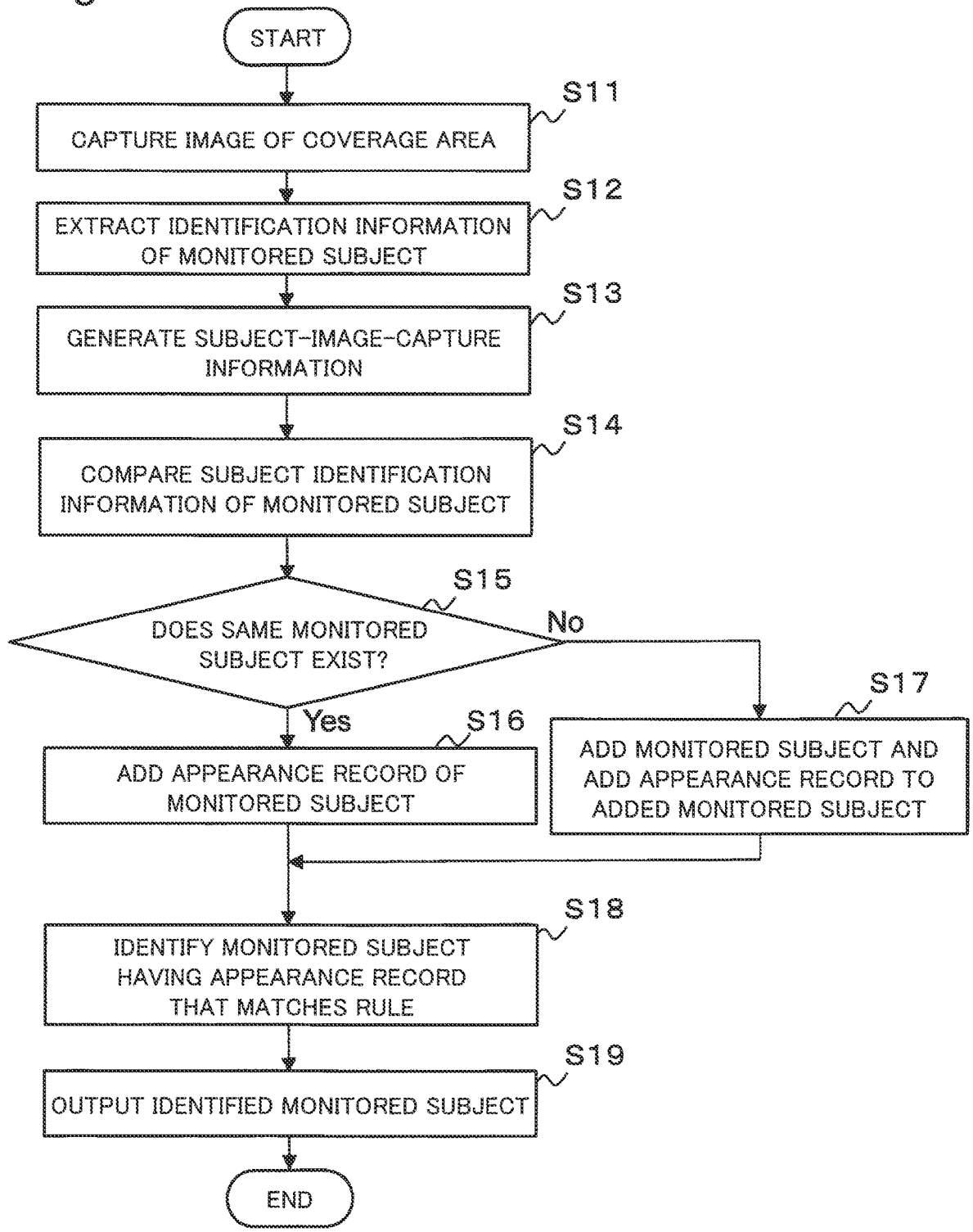
FIG. 6 is a flowchart illustrating an exemplary operation of the image analysis system of the first example embodiment.

An operation of the image analysis system of the present example embodiment will be described next. FIG. 6 is a flowchart illustrating an exemplary operation of the image analysis system of the present example embodiment.

First, an image capture unit 11 captures the image of its coverage area (step S11) and inputs the captured image into the person-identification-information analysis unit 12. When the person-identification-information analysis unit 12 detects the monitored subject in the input image, the person-identification-information analysis unit 12 extracts identification information of the monitored subject (step S12) and also acquires the time of image capture. The person-identification-information analysis unit 12 then generates the subject-image-capture-information including the subject-identification-information and the time of image capture (step S13).

The person-identification-information comparison unit 15 compares the extracted subject-identification-information with the subject-identification-information stored in the appearance record storage unit 22 (step S14). When there is the same monitored subject (Yes at step S15), the appearance record management unit 21 adds the appearance record of the monitored subject (step S16). On the other hand, when the same monitored subject is not present (No at step S15), the appearance record management unit 21 adds the monitored subject and adds the appearance record to the monitored subject (step S17).

The behavior detection unit 25 identifies the monitored subject that has the appearance record that matches the defined rule (step S18). When there is such the identified monitored subject, the result output unit 17 outputs the identified monitored subject (step S19).

In this way, in the present example embodiment, the person-identification-information analysis unit 12 generates the subject-image-capture-information including the subject-identification-information of the monitored subject and the image capture time at which the image of the monitored subject is captured from each the image captured by the image capture unit 11 and the appearance record management unit 21 generates the appearance record of the monitored subject inferred to be the same from a plurality of the generated subject-image-capture-information. Then the behavior detection unit 25 identifies the monitored subject that has the appearance record that matches a defined rule. Therefore, the monitored subject that is displaying suspicious behavior can be analyzed from the captured images even if a monitored area is wide or the monitored subject has not been registered in advance.

According to the present invention, a plurality of the images captured at completely different times or locations (cameras) are handled and feature quantities in the facial images or the like are handled in order to identify the same person (the monitored subject) in the different images. The present invention is characterized in that results of the identification are represented by records based on the times and locations and suspiciousness can be determined only from a pattern of the records.

Second Example Embodiment

A second example embodiment of an image analysis system according to the present invention will be described next. In the first example embodiment, each time the person-identification-information analysis unit 12 extracts the subject-image-capture-information, the appearance record management unit 21 generates the appearance record of the monitored subject that is inferred to be the same. On the other hand, the image analysis system of the present example embodiment generates appearance records at once.

Figure 7:
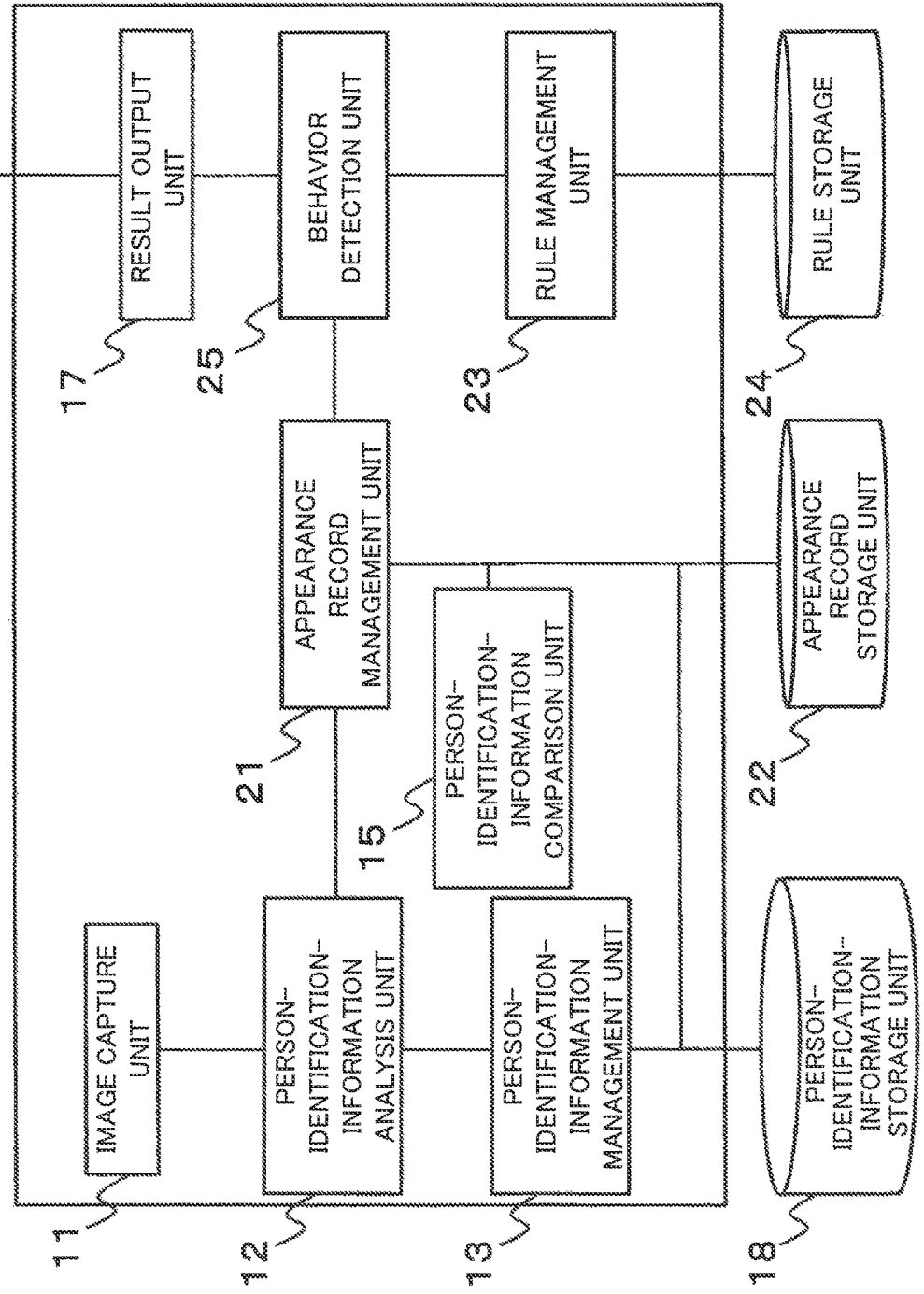
FIG. 7 is a block diagram illustrating a configuration of a second example embodiment of an image analysis system according to the present invention.

FIG. 7 is a block diagram illustrating a configuration of the second embodiment of the image analysis system according to the present invention. Note that components that are similar to the components of the first example embodiment will be given the same reference numerals used in FIG. 1 and the description will be omitted.

The image analysis system of the present example embodiment includes the image capture unit 11, the person-identification-information analysis unit 12, a person-identification-information management unit 13, the person-identification-information comparison unit 15, a person-identification-information storage unit 18, the appearance record management unit 21, the appearance record storage unit 22, the rule management unit 23, the rule storage unit 24, the behavior detection unit 25 and the result output unit 17.

Comparison with the configuration of the image analysis system of the first example embodiment shows that the image analysis system of the present example embodiment further includes the person-identification-information management unit 13, and the person-identification-information storage unit 18. The rest of the configuration is the same as that of the first example embodiment.

The person-identification-information management unit 13 stores the subject-identification-information extracted by the person-identification-information analysis unit 12 into the person-identification-information storage unit 18. In addition, in response to requests from the appearance record management unit 21 and the person-identification-information comparison unit 15, the person-identification-information management unit 13 extracts and returns requested information from the person-identification-information storage unit 18.

The person-identification-information storage unit 18 stores the subject-image-capture-information extracted by the person-identification-information analysis unit 12. Specifically, the person-identification-information storage unit 18 stores an identifier identifying each the subject-image-capture-information, the subject-identification-information included in the subject-image-capture-information, and the time of image capture in association with one another.

FIG. 8 is a diagram illustrating an example of information stored in the person-identification-information storage unit 18. The example illustrated in FIG. 8 is an example of information stored in the person-identification-information storage unit 18 when the monitored subjects are persons. In the example illustrated in FIG. 8, the person image ID is used as the identifier identifying the subject-image-capture-information and the person identification information is used as the subject-identification-information. Further, as illustrated in FIG. 8, the person-identification-information storage unit 18 holds the image capture time at which the image from which the personal identification information is extracted is captured in association with the person image ID and the personal identification information. In addition, the person-identification-information storage unit 18 may store the name of the camera that acquired the image (for example image-capture-device identification information).

The appearance record management unit 21 of the present example embodiment generates the appearance record of the monitored subject that is inferred to be the same from subject-image-capture-information stored in the person-identification-information storage unit 18. Processing for inferring the identity the monitored subject is performed by the person-identification-information comparison unit 15. The method for inferring the identity of the monitored subject and processing for generating the appearance record are the same as those in the first example embodiment.

In this way, in the image analysis system of the present example embodiment, the image-identification-information analysis unit 12 creates the subject-identification-information and stores the subject-identification-information in the person identification storage unit 18 in advance. Then the appearance record management unit 21 generates the appearance record as required. This means that in the image analysis system of the present example embodiment, generation of the subject-identification-information and generation of the appearance record can be performed at different timings. Accordingly, the rule for identifying the monitored subject can be added later.

The person-identification-information analysis unit 12, the person-identification-information management unit 13, the person-identification-information comparison unit 15, the appearance record management unit 21, the rule management unit 23, the behavior detection unit 25 and the result output unit 17 are implemented, for example, by a CPU of a computer that operates in accordance with a program (an image analysis program).

Each of the person-identification-information analysis unit 12, the person-identification-information management unit 13, the person-identification-information comparison unit 15, the appearance record management unit 21, the rule management unit 23, the behavior detection unit 25 and the result output unit 17 may be implemented by a dedicated piece of hardware. Further, the person-identification-information storage unit 18, the appearance record storage unit 27 and the rule storage unit 24 are implemented by a magnetic disk or the like, for example.

Figure 9:
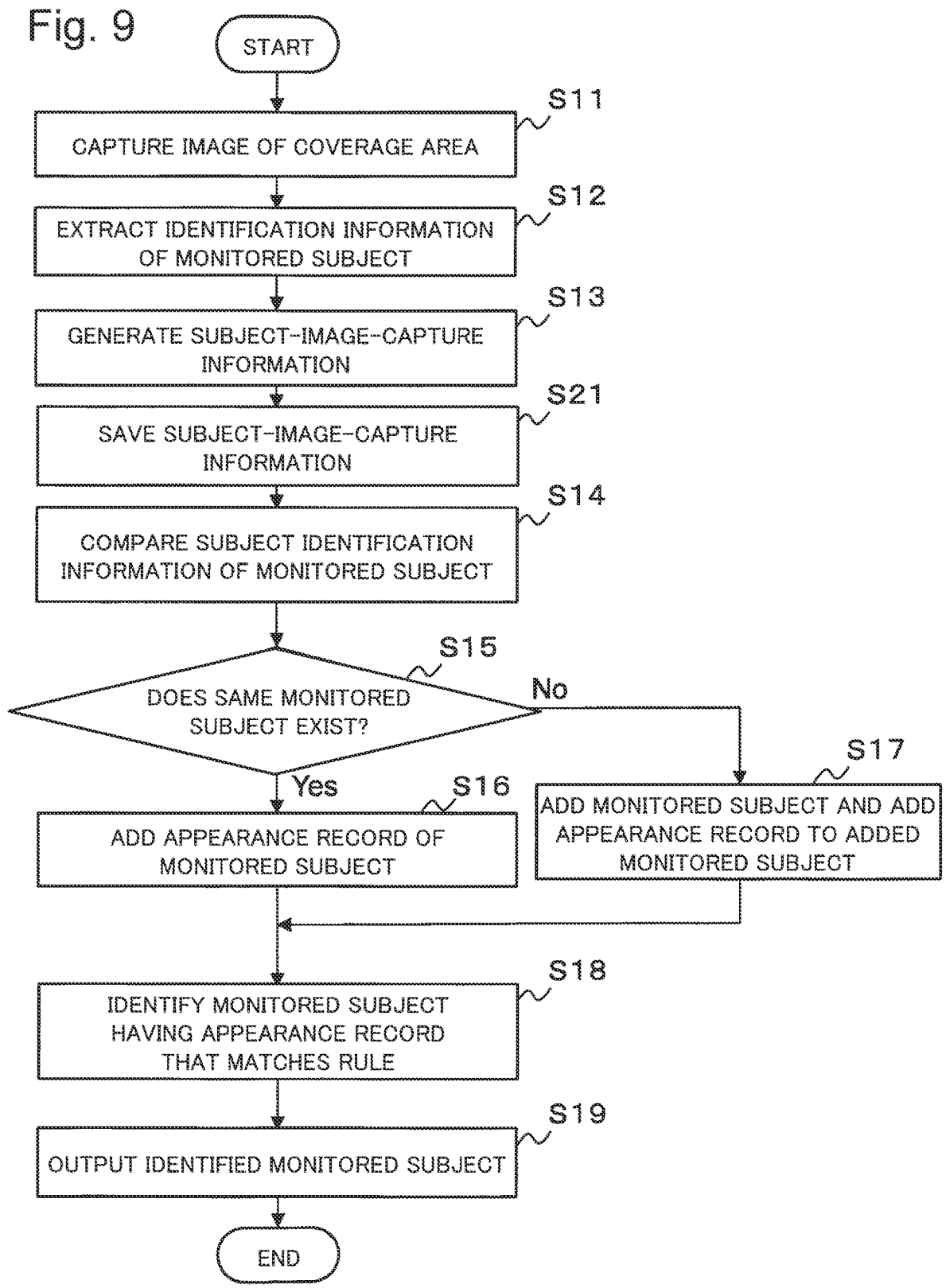
FIG. 9 is a flowchart illustrating an exemplary operation of the image analysis system of the second example embodiment.

An operation of the image analysis system of the present example embodiment will be described next. FIG. 9 is a flowchart illustrating an exemplary operation of the image analysis system of the present example embodiment. The processing from step S11 through step S13 for generating the subject-identification-information from the image is the same as the process illustrated in FIG. 6.

The person-identification-information management unit 13 stores the subject-identification-information extracted by the person-identification-information analysis unit 12 into the person-identification-information storage unit 18 (step S21). At a predetermined timing, the person-identification-information comparison unit 15 compares the subject-identification-information stored in the person-identification-information storage unit 18 with the subject-identification-information stored in the appearance record storage unit 22 (step S14). Note that if the appearance record storage unit 22 does not hold the subject-identification-information and holds only person image IDs, for example, the person-identification-information comparison unit 15 may identify the associated subject-identification-information from the person-identification-information storage unit 18.

The subsequent processing from step S15 through step S19 for determining whether there is the same monitored subject and extracting the monitored subject that matches the rule is the same as the process illustrated in FIG. 6.

In this way, in the present example embodiment, the person-identification-information management unit 13 once stores the subject-identification-information extracted by the person-identification-information analysis unit 12 into the person-identification-information storage unit 18. Accordingly, generation of the subject-identification-information and generation of the appearance record can be performed at different timings, so that the rule for identifying the monitored subject can be added later.

Third Example Embodiment

A third example embodiment of the image analysis system according to the present invention will be described next. The image analysis system of the present example embodiment uses the time of occurrence of the event and the location of occurrence of the event for the rule. Specifically, the rule defined in the present example embodiment is that "the monitored subject that has a number of the appearance records including the image capture time that is close to the time and date of occurrence of the event and the image capture location that is close to the location of occurrence of the event that is greater than or equal to a predetermined number is extracted".

The image capture time that is close to the time and date of occurrence of the event means an image capture time with a difference less than or equal to a predetermined threshold from the time of occurrence of the event; the image capture location close to the location of occurrence of the event means an image capture location with a distance less than or equal to a predetermined threshold from the location of occurrence of the event. A location of image capture includes the location of the camera and the coverage area of the camera.

Note that when the distance between the location of occurrence of the event and the image capture location is determined, the time actually taken to move from the image capture location to the image capture location of the event may be used as the distance. If a roundabout route needs to be taken, it will take a long time to move from one image capture location to another image capture location even if the image capture locations are physically close. In such a case, it may be determined that the distance between the two locations is long. On the other hand, it will take short time to move from one image capture location to another image capture location that is physically far from the former location, if means other than on foot (such as bicycle or moving walkways) is available to move to the image capture location. In such a case, it may be determined that the distance between the two locations is short.

Figure 10:
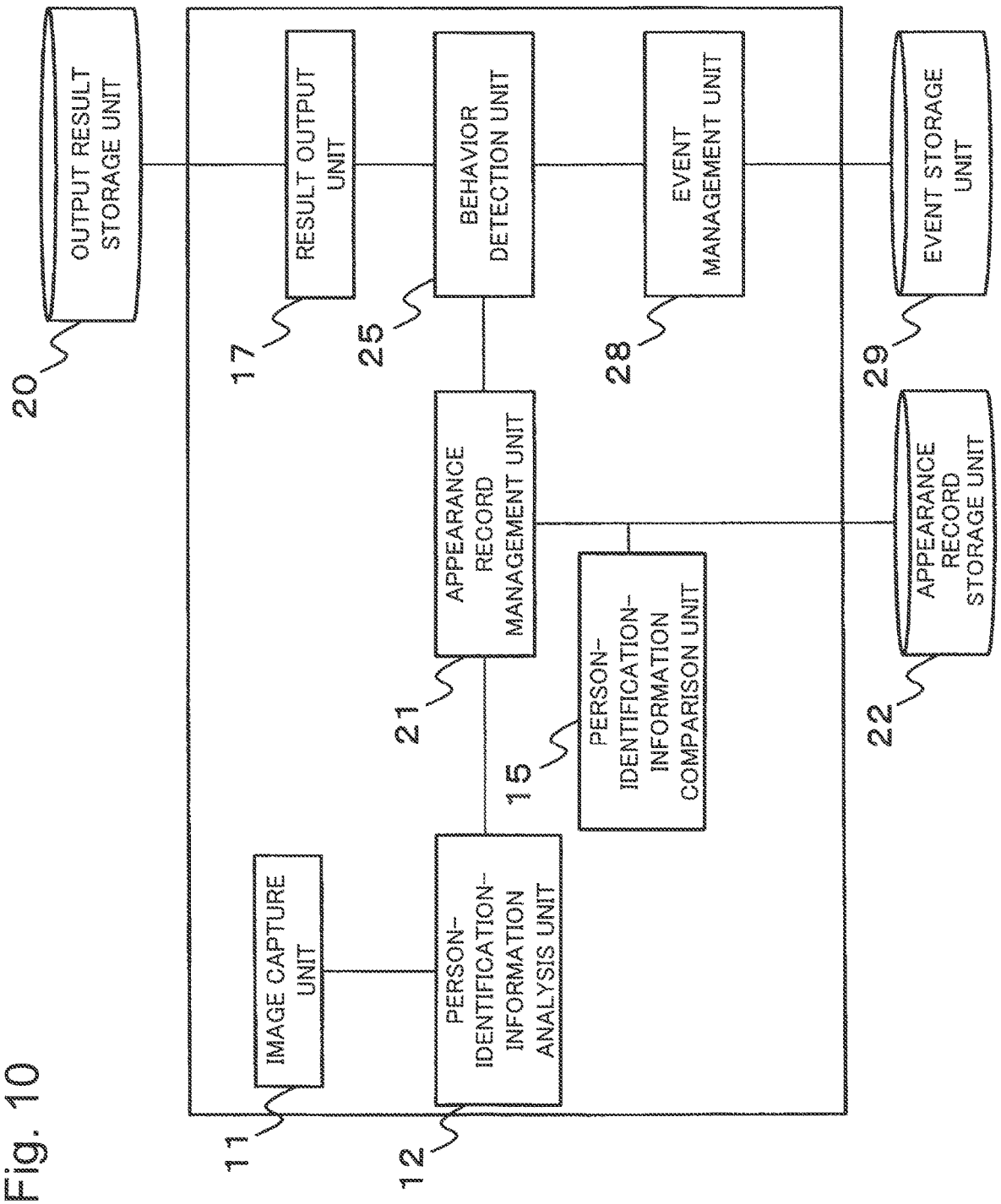
FIG. 10 is a block diagram illustrating a configuration of a third example embodiment of an image analysis system according to the present invention.

FIG. 10 is a block diagram illustrating a configuration of the third example embodiment of the image analysis system according to the present invention. Note that components that are similar to the components of the first example embodiment will be given the same reference numerals used in FIG. 1 and the description will be omitted.

The image analysis system of the present example embodiment includes the image capture unit 11, the person-identification-information analysis unit 12, the person-identification-information comparison unit 15, the appearance record management unit 21, the appearance record storage unit 22, an event management unit 28, an event storage unit 29, the behavior detection unit 25 and the result output unit 17.

Comparison with the configuration of the image analysis system of the first example embodiment shows that the image analysis system of the present example embodiment includes the event management unit 28 instead of the rule management unit 23 and includes the event storage unit 29 instead of the rule storage unit 24. The rest of the configuration is the same as that of the first example embodiment.

Figure 11:
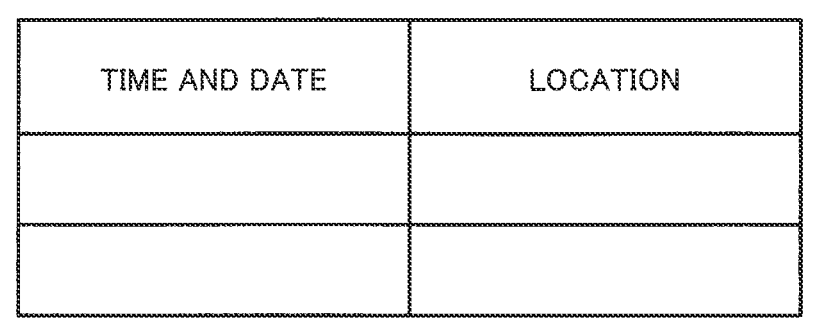

The event storage unit 29 stores event information used by the behavior detection unit 25 to identify the monitored subject. The event information includes the event occurrence time and the event occurrence location. FIG. 11 illustrates an example of information stored in the event storage unit 29. In the example illustrated in FIG. 11, the event storage unit 29 stores the time and date of occurrence of the event and the location of occurrence of the event in association with each other as event information.

Event information may include information for identifying specifics of the event. It is assumed in the present example embodiment that event information is set in the event storage unit 29 in advance. In addition, at least two items of event information are set for each type of event to be analyzed in the event storage unit 29.

The image analysis system (specifically, the behavior detection unit 25) of the present example embodiment extracts the monitored subject that has a number of appearance records including the image capture time close to the time and date of occurrence of the event and the image capture location close to the location of occurrence of the event that is greater than or equal to a predetermined number, as described above. Accordingly, it can be said that specifics of event stored in the event storage unit 29 represents specifics of the rule stored in the rule storage unit 24. In other words, the rule storage unit 24 of the first example embodiment contains a list of events as a type of rule.

If the event storage unit 29 holds information identifying specifics of events, the behavior detection unit 25 may count, for the same event or each set of similar events, the appearance records that have the image capture time close to the time and date of occurrence of event and the image capture location close to the locations of occurrence of the events. The behavior detection unit 25 may extract the monitored subject that has a number of appearance records greater than or equal to a threshold that is determined for each event.

The event management unit 28 extracts and returns required information from the event storage unit 29 in response to a request from the behavior detection unit 25.

The person-identification-information analysis unit 12, the person-identification-information comparison unit 15, the appearance record management unit 21, the event management unit 28, the behavior detection unit 25 and the result output unit 17 are implemented by a CPU of a computer, for example, that operates in accordance with a program (an image analysis program).

Each of the person-identification-information analysis unit 12, the person-identification-information comparison unit 15, the appearance record management unit 21, the event management unit 28, the behavior detection unit 25, and the result output unit 17 may be implemented by a dedicated piece of hardware. The appearance record storage unit 22 and the event storage unit 29 are implemented by a magnetic disk or the like, for example.

As described above, in the present example embodiment, the behavior detection unit 25 identifies the monitored subject that appears close in time and location to the event that has occurred. Specifically, the behavior detection unit 25 identifies the monitored subject that has a number of appearance records including the image capture time close to the time and date of occurrence of the event and the image capture location close to the location of occurrence of the event that is greater than or equal to a predetermined number.

In the present example embodiment, because the rules are defined in terms of event occurrence in this way, the monitored subject can be identified in accordance with a matter of interest.

Fourth Example Embodiment

A fourth example embodiment of an image analysis system according to the present invention will be described next. Like the image analysis system of the third example embodiment, the image analysis system of the present example embodiment uses the time of occurrence of the event and the location of occurrence of the event for the rule. While event information is set in the event storage unit 29 in advance in the third example embodiment in the third example embodiment, event information is stored in the event storage unit 29 as needed in the fourth example embodiment.

Figure 12:
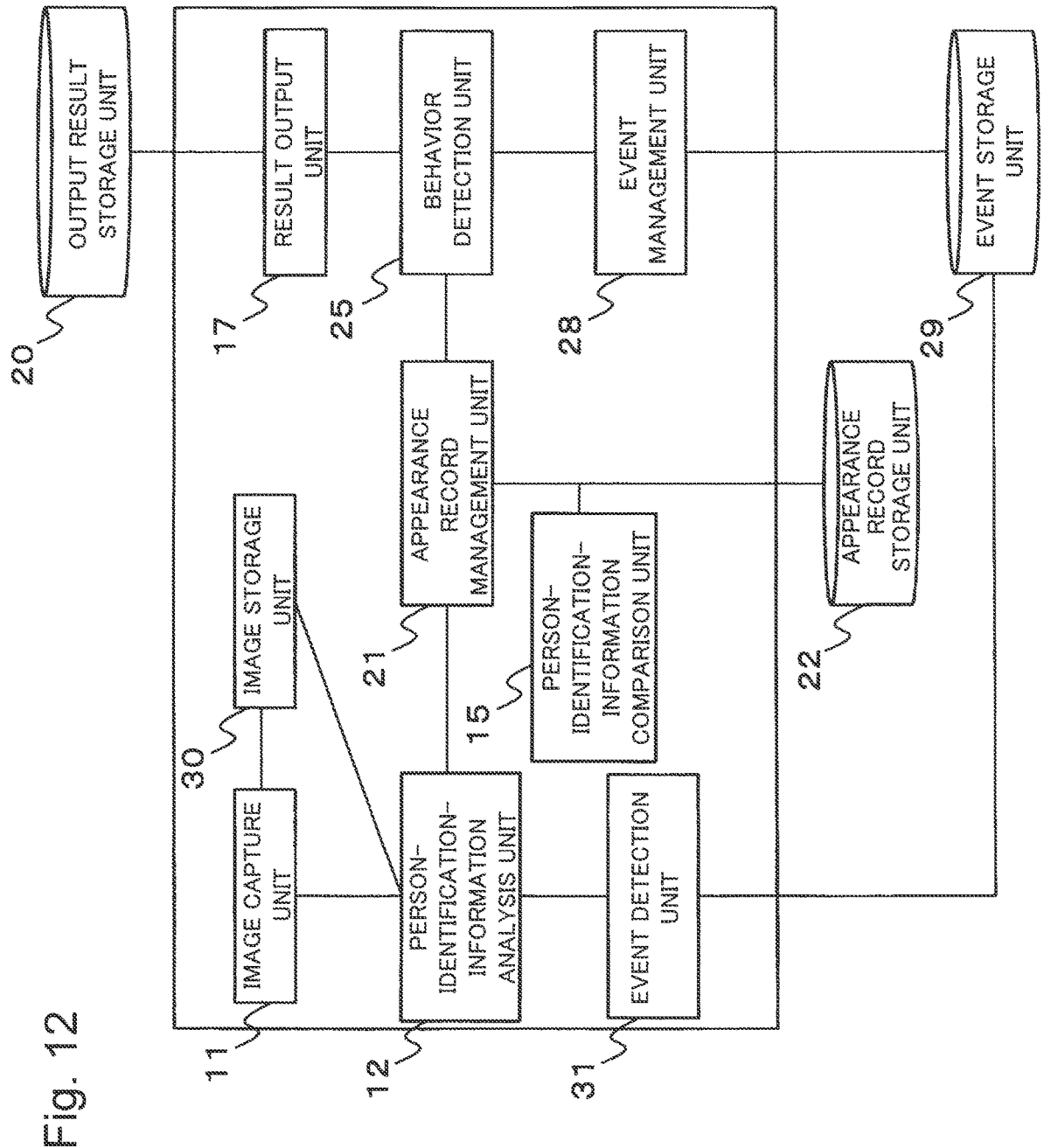
FIG. 12 is a block diagram illustrating a configuration of a fourth example embodiment of an image analysis system according to the present invention.

FIG. 12 is a block diagram illustrating a configuration of the fourth example embodiment of the image analysis system according to the present invention. Note that components that are similar to the components of the third example embodiment will be given the same reference numerals used in FIG. 10 and the description will be omitted.

The image analysis system of the present example embodiment includes the image capture unit 11, the person-identification-information analysis unit 12, the person-identification-information comparison unit 15, the appearance record management unit 21, the appearance record storage unit 22, the event management unit 28, the event storage unit 29, the behavior detection unit 25, the result output unit 17, an image storage unit 30 and an event detection unit 31.

Comparison with the configuration of the image analysis system of the third example embodiment shows that the image analysis system of the present example embodiment further includes the image storage unit 30 and the event detection unit 31. The rest of the configuration is the same as that of the third example embodiment.

The image storage unit 30 stores the image captured by the image capture unit 11.

The event detection unit 31 detects the event used by the behavior detection unit 25 for identifying the monitored subject. The event detected by the event detection unit 31 may be of any type that can be used for identifying the monitored subject displaying suspicious behavior. The event detection unit 31 itself may detect occurrence of the event or may receive a notification that the event has occurred from another device (not depicted) to detect occurrence of the event. For example, the event detection unit 31 may be provided with a sensor (not depicted) and may detect occurrence of the event from a phenomenon detected by the sensor.

For example, assume a problem such as an abandonment of a suspicious object has been detected by analyzing the image captured by a separate surveillance camera. In this case, the event detection unit 31 may receive information indicating the location and time at which the suspicious object is detected as event information from the device (not depicted) that has analyzed the image. The event detection unit 31 may then instruct the event management unit 28 to register the received event information in the event storage unit 29.

Further, assume, for example, that the event detection unit 31 includes a microphone and the microphone captures abnormal noise (such as sound of vandalism or screaming). In this case, the event detection unit 31 may instruct the event management unit 28 to register event information indicating the location and time at which the abnormal noise is detected in the event storage unit 29.

Further, assume, for example, that a smoke detector (not depicted) installed in a nonsmoking area detects smoke. In this case, the event detection unit 31 may receive information indicating that the smoke detector has detected smoke as event information from the smoke detector. The event detection unit 31 may then instruct the event management unit 28 to register the time at which the event detection unit 31 received the event information and the location in which the smoke detector is installed in the event storage unit 29 as event information indicating smoking.

Further, the event detection unit 31 may detect occurrence of the event from information uploaded on the Internet, in addition to from the sensor detecting a phenomenon that has occurred. For example, the event detection unit 31 may analyze text uploaded on a website to identify the event information such as the time and location of occurrence of the event and specifics of the event and may instruct the event management unit 28 to register the identified event information in the event storage unit 29. In this case, in order to enhance the accuracy of detection of the event, the event detection unit 31 may instruct to register event information when the event detection unit 31 identified a plurality of events with the same specifics.

Note that events for which the event detection unit 31 instructs the event management unit 28 to register are not limited to events that is currently occurring. The event detection unit 31 may receive manually input event information after occurrence of the event (posterior) and may instruct the event management unit 28 to register the event information in the event storage unit 29.

For example, assume that accidents such as theft, vandalism, arson, or assault have frequently occurred. In this case, the event detection unit 31 may take manually input information indicating the times and locations of occurrence of the accidents and may instruct the event management unit 28 to register the input event information into the event storage unit 29. Once such the event information has been registered, a suspicious person who frequently appeared can be detected by analyzing images captured with surveillance cameras in the past.

In addition, the event detection unit 31 may receive the event information about the event that is expected to occur prior to occurrence of the event (anterior) and may instruct the event management unit 28 to register the event information in the event storage unit 29.

For example, assume that one predicts high-crime area and time of day from records of occurrence of crimes or the like in the past. In this case, the event detection unit 31 may take inputs of the predicted items of information as the event information and may instruct the event management unit 28 to register the input event information in the event storage unit 29. Once such the event information has been registered, persons appearing in the predicted high-crime area and time of day more than once can be detected.

The person-identification-information analysis unit 12 of the present example embodiment analyses the image captured in certain periods of time before and after the time of occurrence of the event detected by the event detection unit 31 to extract the subject-image-capture-information (subject-identification-information).

For example, when the event is detected with the sensor or the like, the person-identification-information analysis unit 12 extracts the image captured during a certain period before the detection of the event from the image storage unit 30 and analyses the images to extract the subject-image-capture-information (the subject-identification-information). In addition, the person-identification-information analysis unit 12 takes inputs of the image captured during a certain period after the detection of the event from the image capture unit 11 and analyzes the image to extract the subject-image-capture-information (the subject-identification-information).

In this way, the amount of the image that needs to be analyzed can be limited and therefore, unnecessary processing can be avoided.

Note that when the event that occurred in the past is input into the event detection unit 31, the person-identification-information analysis unit 12 may extract the image captured in certain periods of time before and after the time of occurrence of the event from the image storage unit 30 and may analyze the image to extract the subject-image-capture-information (the subject-identification-information).

Further, when the event that is expected to occur in the future is input into the event detection unit 31, the person-identification-information analysis unit 12 may take inputs of the image captured during a certain period after the expected time of occurrence of the event from the image capture unit 11 and may analyze the image to extract the subject-image-capture-information (subject-identification-information).

The person-identification-information analysis unit 12, the person-identification-information comparison unit 15, the appearance record management unit 21, the event management unit 28, the behavior detection unit 25, the result output unit 17, and the event detection unit 31 are implemented, for example, by a CPU of a computer that operates in accordance with a program (an image analysis program).

Each of the person identification information 12, the person-identification-information comparison unit 15, the appearance record management unit 21, the event management unit 28, the behavior detection unit 25, the result output unit 17, and the event detection unit 31 may be implemented by a dedicated piece of hardware. The appearance record storage unit 22, the event storage unit 29, and the image storage unit 30 are implemented by a magnetic disk or the like, for example.

Figure 13:
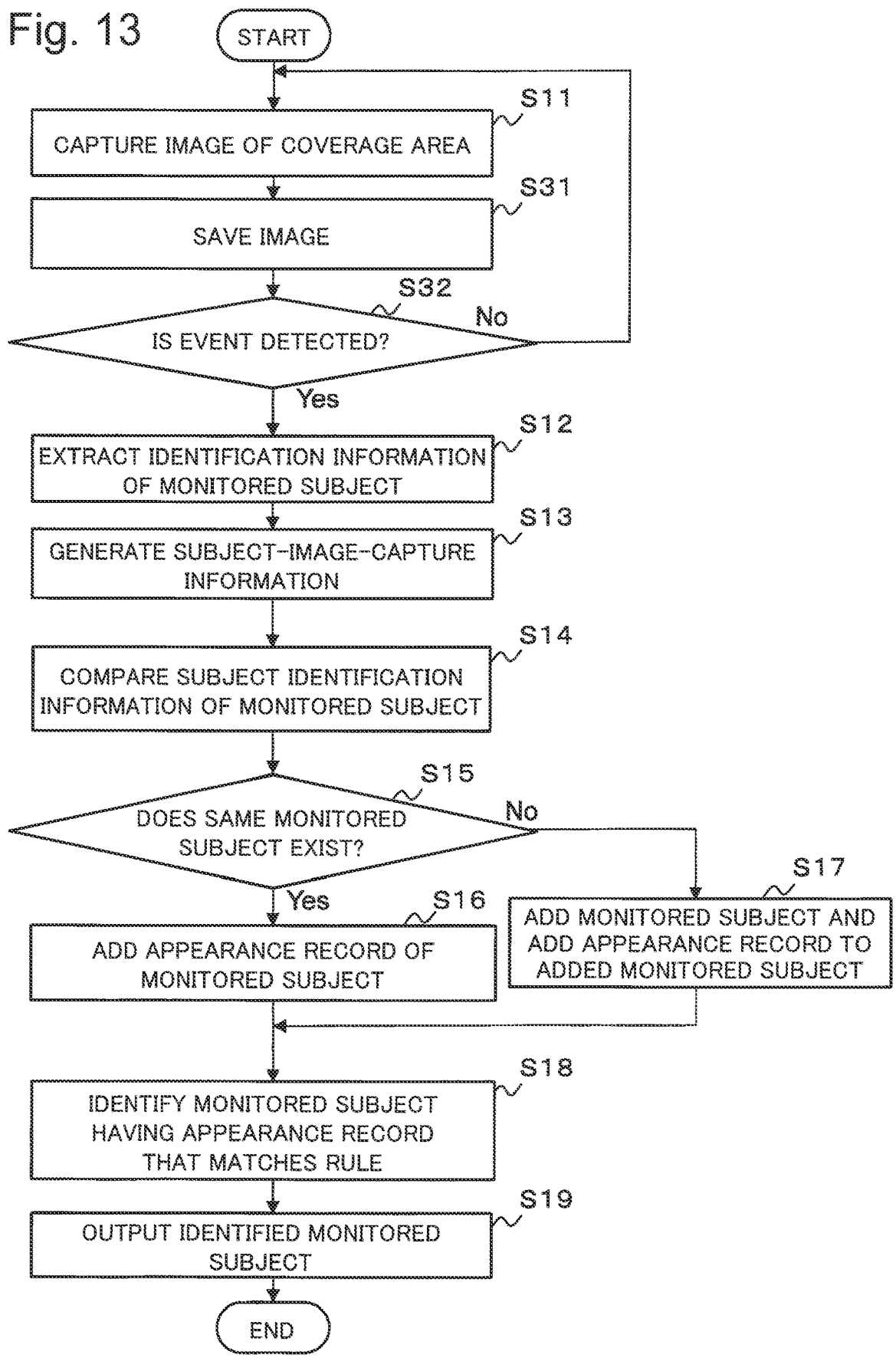
FIG. 13 is a flowchart illustrating an exemplary operation of the image analysis system of the fourth example embodiment.

An operation of the image analysis system of the present example embodiment will be described next. FIG. 13 is a flowchart illustrating an exemplary operation of the image analysis system of the present example embodiment. First, the image capture unit 11 captures the image of its coverage area (step S11) and stores the captured the image into the image storage unit 30 (step S31). When the event detection unit 31 does not detect the event (No at step S32), the processing at step S11 and the subsequent steps are repeated.

On the other hand, when the event detection unit 31 detects the event (Yes at step S32), the person-identification-information analysis unit 12 extracts identification information of the monitored subject from the image captured in certain periods of time before and after the detection of the event (step S12). The rest of the process is the same as the processing from step S13 through step S19 illustrated in FIG. 6.

As described above, in the present example embodiment, when the event detection unit 31 detects the event, the person-identification-information analysis unit 12 extracts the identification information of the monitored subject from the image captured in certain periods of time before and after the detection of the event. Accordingly, the amount of processing for analyzing the image can be limited.

The image analysis system of the present example embodiment is capable of identifying the monitored subject by using the image captured with cameras installed around a location as long as the event can be detected using the sensor or the like even if it is difficult to install cameras in the location and capture the image.

Fifth Example Embodiment

A fifth example embodiment of an image analysis system according to the present invention will be described next. In the fifth example embodiment, not only the monitored subject that matches the rule but also a subject expected to be related to the monitored subject are identified.

Figure 14:
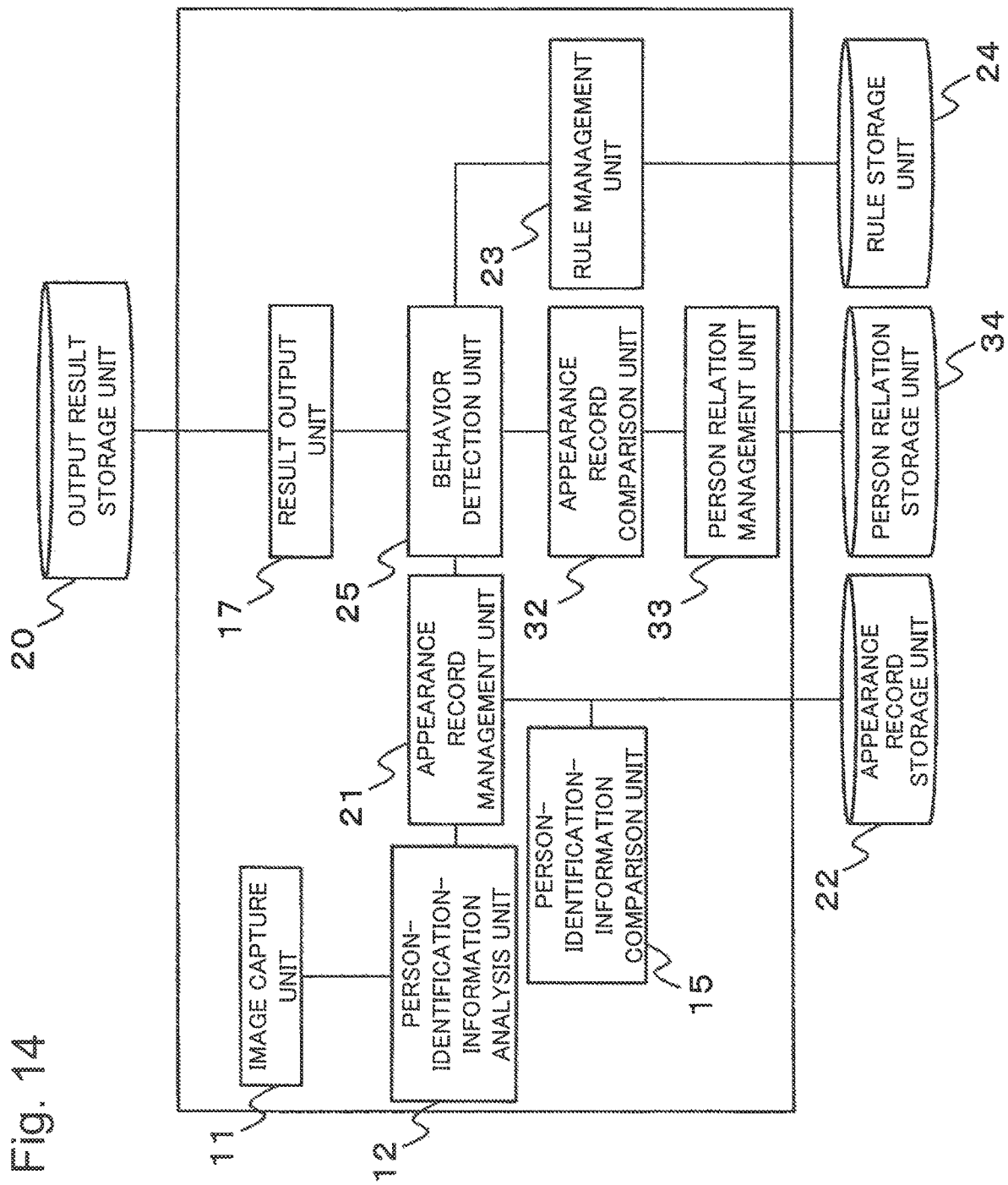
FIG. 14 is a block diagram illustrating a configuration of a fifth example embodiment of an image analysis system according to the present invention.

FIG. 14 is a block diagram illustrating a configuration of the fifth example embodiment of the image analysis system according to the present invention. Note that components that are similar to the components of the first example embodiment will be given the same reference numerals used in FIG. 1 and the description will be omitted.

The image analysis system of the present example embodiment includes the image capture unit 11, the person-identification-information analysis unit 12, the person-identification-information comparison unit 15, the appearance record management unit 21, the appearance record storage unit 22, the rule management unit 23, the rule storage unit 24, the behavior detection unit 25, the result output unit 17, an appearance record comparison unit 32, a person relation management unit 33 and a person relation storage unit 34. The image analysis system may be connected to an output result storage 20 that stores output results.

Comparison with the configuration of the image analysis system of the first example embodiment shows that the image analysis system of the present example embodiment further includes the appearance record comparison unit 32, the person relation management unit 33, and the person relation storage unit 34. The rest of the configuration is the same as that of the first example embodiment.

The appearance record comparison unit 32 identifies the related monitored subject based on similarity between the different monitored subjects. Specifically, the appearance record comparison unit 32 compares appearance records of the different monitored subjects and counts appearance records in which locations of appearance of the monitored subjects (the image capture locations or the image-capture-device identification information) and times of appearance of the monitored subjects (image capture times) are close to one another.

To say that locations of appearance are close to one another means that the locations where the monitored subjects appeared are close to one another because the subjects were captured with the same camera or cameras installed close to one another. The time taken to move from one location of appearance to another described in the first example embodiment may be taken into account when determination is made as to whether the locations of appearance are close to one another. To say that times of appearance are close to one another means that image capture times are close to one another. A period of several tens of seconds or less is set as a time period for determining that times of appearance are close to one another.

When the number of appearance records is greater than or equal to a threshold, the appearance record comparison unit 32 determines that the monitored subjects are related to each other. When different monitored subjects have a plurality of close appearance records, it can be said that the appearance records are similar to one another. Note that the threshold is set to at least "2", for example. The appearance record comparison unit 32 performs the processing described above at an arbitrary timing before the behavior detection unit 25 compares appearance records with rules.

Examples of situations where a plurality of the monitored subjects can be determined to be related with one another includes the situation where a group of people are walking around. For example, when people appear nearly the same time in only one location in a public facility, it can be determined that the people are strangers who happen to be there. When people appear in two locations distant from each other at nearly the same time, the people could be members of a group but could be there by chance. However, when people appear in three or more locations distant from one another at nearly the same time, they are likely to be members of a group and can therefore be inferred to be related to one another.

Figure 15:
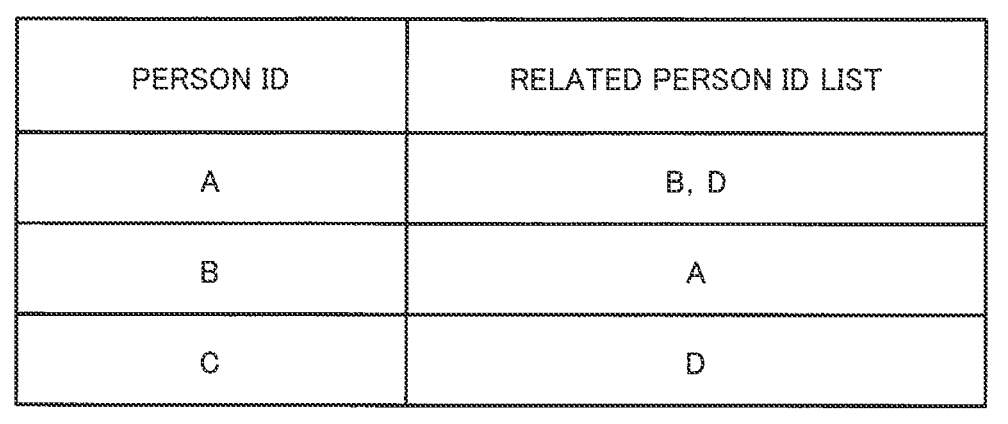

The person relation management unit 33 registers a list of the monitored subjects determined to be related to one another by the appearance record comparison unit 32 in the person relation storage unit 34. The person relation storage unit 34 stores the list of related monitored subjects. FIG. 15 is a diagram illustrating an example of information stored in the person relation storage unit 34. In the example illustrated in FIG. 15, the person relation storage unit 34 stores, in association with each person ID, the person ID or IDs of one or more persons identified as related persons.

When the behavior detection unit 25 of the present example embodiment identifies the monitored subject that matches the rule in which the pattern of the appearance records is defined, the behavior detection unit 25 also identifies the monitored subject that relates to the monitored subject. Specifically, when the behavior detection unit 25 identifies the monitored subject that matches the rule, the behavior detection unit 25 identifies the monitored subject related to the identified monitored subject from the person relation storage unit 34. The result output unit 17 outputs the related monitored subject together with the monitored subject that matches the rule.

The behavior detection unit 25 may identify the monitored subject appearing close to the event that has occurred, as described in the third or fourth example embodiment, and may output the monitored subject related to the identified monitored subject. In the present example embodiment, the appearance record comparison unit 32 identifies the related monitored subject based on the similarity between the appearance records of the different monitored subjects. In this way, not only the monitored subject that matches the rule but also the monitored subject that is presumably related to the monitored subject can be identified.

Note that the person-identification-information analysis unit 12, the person-identification-information comparison unit 15, the appearance record management unit 21, the rule management unit 23, the behavior detection unit 25, the result output unit 17, the appearance record comparison unit 32, and the person relation management unit 33 are implemented, for example, by a CPU of a computer that operates in accordance with a program (an image analysis program).

Each of the person-identification-information analysis unit 12, the person-identification-information comparison unit 15, the appearance record management unit 21, the rule management unit 23, the behavior detection unit 25, the result output unit 17, the appearance record comparison unit 32, and the person relation management unit 33 may be implemented by a dedicated piece of hardware. The appearance record storage unit 22, the rule storage unit 24 and the person relation storage unit 34 are implemented by a magnetic disk or the like, for example.

A variation of the fifth example embodiment will be described next. In the fifth example embodiment, the behavior detection unit 25 identifies the monitored subject that matches the rule and also identifies the monitored subject that is related to the monitored subject. In the present variation, the behavior detection unit 25 identifies the related monitored subject from among a plurality of the monitored subjects that match the rule.

Specifically, the behavior detection unit 25 identifies a plurality of monitored subjects that match a rule. The behavior detection unit 25 determines, from the person relation storage unit 34, whether or not the plurality of the identified monitored subjects include the monitored subjects that are related with each other. When the related subjects as many as or more than a predetermined number are included, the behavior detection unit 25 identifies the related monitored subjects. By determining whether or not the monitored subjects that match a rule are related in this way, the following situation, for example, can be inferred.

For example, if one of people using a public facility displays a pattern of behavior like a pickpocket looking over the facility, the people can be a group of pickpockets. However, if only one of the people is displaying suspicious behavior, the person may happen to be displaying such behavior. On the other hand, if a plurality of persons among related people are displaying suspicious behavior, the related people are likely to be members of a group that performs a suspicious activity.

The behavior detection unit 25 may further use information in the rule (the event) used when the monitored subject is detected to identify another monitored subject. By using the rule (the event) used when the monitored subject is identified in this way, the following situation, for example, can be inferred.

For example, assume that 10 similar criminal events (for example pickpocketing) have occurred. Assume that there is not a person who has appeared in five or more of the events but there are many persons (for example 100 persons) who have appeared in a couple of events. If determination is made based only on whether persons match the rule, suspicious persons cannot be identified when the rule is set that a person appearing in five similar events is to be identified as being suspicious but too many people will be identified as being suspicious when the rule is set that a person appearing in two or three similar events is to be identified as being suspicious.

However, if there are members of a group among the 100 people and the members are observed in different events, it can be inferred that they are a group of pickpockets. Further, if members of a group are observed in the same event, it can be inferred that they are just acting together. In such a case, the behavior detection unit 25 may identify, among the monitored subjects that match the rule, the monitored subjects that are related to one another and match the different rule.

Because the behavior detection unit 25 identifies the monitored subject that are related to one another from among a plurality of the monitored subjects that match the rule based on the similarity between the monitored subjects as described above, the present variation can enhance the accuracy of identifying the monitored subjects.

Figure 16:
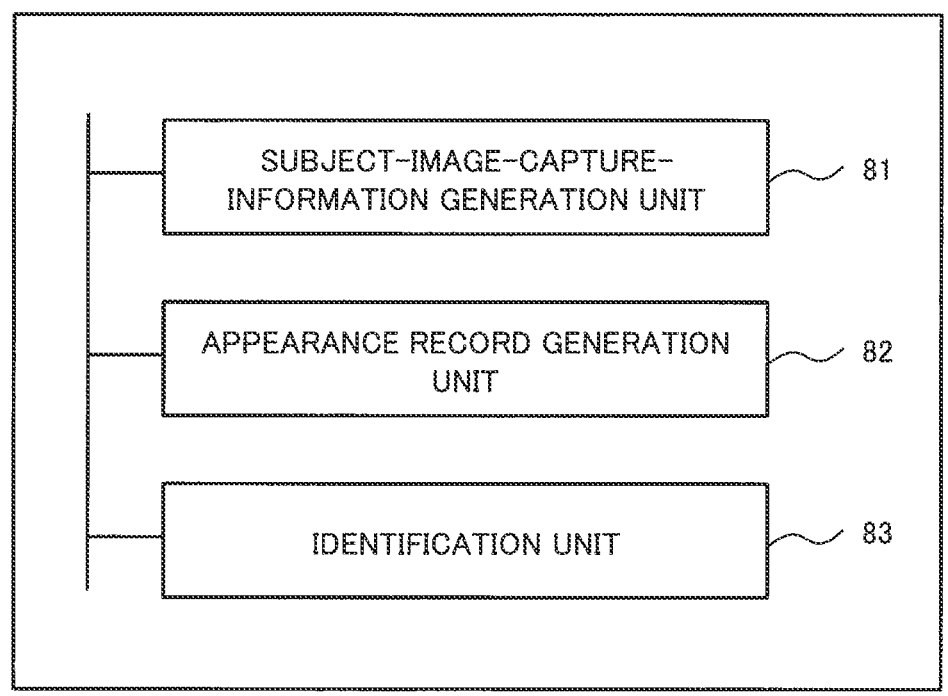
FIG. 16 is a block diagram illustrating an overview of an image analysis system according to the present invention.

The present invention will be summarized next. FIG. 16 is a block diagram illustrating an overview of an image analysis system according to the present invention. The image analysis system according to the present invention includes: subject-image-capture-information generating means 81 (for example, the person-identification-information analysis unit 12) for extracting subject-identification-information (for example, the facial image or the number plate image) which is the identification information of the monitored subject (for example, a person or a vehicle) as information used for inferring the identity of the monitored subject from the image (for example, the image captured by the image capture unit 11) and generating subject-image-capture-information including the extracted subject-identification-information and image capture time at which the image of the monitored subject is captured; appearance record generation means 82 (for example, the person-identification-information comparison unit 15, the appearance record management unit 21) for generating an appearance history of the monitored subject inferred to be identical from a plurality of the generated subject-image-capture-information; and identification means 83 (for example, the behavior detection unit 25) for identifying the monitored subject that has an appearance record that matches a defined rule (for example, a rule stored in the rule storage unit 24).

With the configuration as described above, the monitored subject that is displaying suspicious behavior can be analyzed from the captured image even when a wide area is monitored or the monitored subject to be detected has not been registered in advance. In other words, according to the present invention, a camera that monitors an entire desired surveillance area does not need to be set because behavior of the monitored subject is inferred based on an appearance record of the monitored subject.

The subject-image-capture-information generation unit 81 may generate subject-image-capture-information including an image capture location in which a monitored object has been captured (such as a location in which a camera is installed, image-capture-device identification information, the coverage area of the camera, for example) and the appearance record generation unit 82 may generate an appearance record including the image capture location. The identification unit 83 may identify the monitored subject that has a generated appearance record that matches a rule (such as the first to fourth rules described previously, for example) defined by a relationship between two or more appearance records including an image capture location and an image capture time. With such configuration, the monitored subject can be identified based on appearance information included in an appearance record.

Specifically, the identification unit 83 may identify the monitored subject that has a number of appearance records that include an image capture time close to the time and date of occurrence of the event and an image capture location close to the location of occurrence of the event that is greater than or equal to a predetermined number.

The image analysis system may include detection unit (for example, the event detection unit 31) for detecting the event that has occurred. The subject-image-capture-information generation unit 81 may generate the subject-image-capture-information for the image captured in certain period before and after occurrence of the event. Such configuration can reduce the amount of image to be analyzed.

The image analysis system may include a relation identification unit (for example, the appearance record comparison unit 32) for identifying the related monitored subject based on the similarity between appearance records of the different monitored subjects. With such configuration, not only the monitored subject that matches rule but also a monitored object inferred to be related to the monitored subject can be identified.

Further, the relation identification unit may identify the related monitored subject from among a plurality of the monitored subjects that match the rule based on the similarity between appearance records of the monitored subjects. Such configuration can further enhance the accuracy of identifying the monitored subject.

Further, the subject-image-capture-information generation unit 81 may extract the facial image as the subject-identification-information. Then the appearance record generation unit 82 may compare the facial images included in the generated subject-image-capture-information to infer whether the monitored subject is identical.

For example, the rule may be defined that a subject does not have the appearance record indicating another image capture location in which the subject is expected to appear based on the given image capture location in a certain period after the appearance record indicating the given image capture location (the rule storage unit 24, for example, may store the rule). The identification unit 83 may then identify the monitored subject that matches the rule.

While the present invention has been described with reference to example embodiments and examples, the present invention is not limited to the example embodiments and examples described above. Various modifications which will be apparent to those skilled in the art can be made to the configurations and details of the present invention within the scope of the present invention.

This application is based upon and claims the benefit of priority from Japanese Patent Application No. 2014-092401 filed on Apr. 28, 2014 and the entire disclosure of which is incorporated herein by reference.

INDUSTRIAL APPLICABILITY

The present invention is suitably applicable to, for example, image analysis system that automatically detects a person displaying behavior that matches a particular rule in a specific area by using an image captured with a surveillance camera.

REFERENCE SIGNS LIST

11 Image capture unit
12 Person-identification-information analysis unit
13 Person-identification-information management unit
15 Person-identification-information comparison unit
17 Result output unit
18 Person-identification-information storage unit
20 Output result storage unit
21 Appearance record management unit
22 Appearance record storage unit
23 Rule management unit
24 Rule storage unit
25 Behavior detection unit
28 Event management unit
29 Event storage unit
31 Event detection unit
32 Appearance record comparison unit
33 Person relation management unit
34 Person relation storage unit
u1-u10 Person

The invention claimed is:

1. An image analysis system comprising:
a memory storing instructions;
a central processing unit (CPU) connected to the memory that, based on the instructions, performs operations comprising:
generating an appearance record of an object, the appearance record representing a time when the object appeared in a camera captured image and a location of the object when the object appeared in the camera captured image, the appearance record including appearance time information and location information of the object specified by the camera captured image, wherein generating the appearance record comprises determining that a continuous appearance of the object in one or more camera captured images during a predetermined period constitutes one appearance;
specifying the object as a monitored object when both
a time interval is within a predetermined time interval, the time interval being calculated using the time information in the appearance record, and
an appearance pattern in the time interval is a predetermined pattern, the appearance pattern being specified based on the location information in the appearance record; and
providing output identifying the monitored object.

2. The image analysis system according to claim 1, the operations further comprising identifying the monitored object based on similarity between appearance records of a plurality of objects.

3. The image analysis system according to claim 2, wherein identifying the monitored object further comprises determining whether the plurality of objects match a rule based on a similarity between the appearance records of the plurality of objects.

4. An image analysis method comprising:
generating an appearance record of an object, the appearance record representing a time when the object appeared in a camera captured image and a location of the object when the object appeared in the camera captured image, the appearance record including appearance time information and location information of the object specified by the camera captured image, wherein generating the appearance record comprises determining that a continuous appearance of the object in one or more camera captured images during a predetermined period constitutes one appearance;
specifying the object as a monitored object when both
a time interval is within a predetermined time interval, the time interval being calculated using the time information in the appearance record, and
an appearance pattern in the time interval is a predetermined pattern, the appearance pattern being specified based on the location information in the appearance record; and
providing output identifying the monitored object.

5. A non-transitory storage medium storing an analysis program including a processor causing a computer to execute:
generating an appearance record of an object, the appearance record representing a time that the object appeared in a camera captured image and a location of the object when the object appeared in the camera captured image, the appearance record including appearance time information and location information of the object specified by the camera captured image, wherein generating the appearance record comprises determining that a continuous appearance of the object in one or more camera captured images during a predetermined period constitutes one appearance;
specifying the object as a monitored object when both
a time interval is within a predetermined time interval, the time interval being calculated using the time information in the appearance record, and
an appearance pattern in the time interval is a predetermined pattern, the appearance pattern being specified based on the location information in the appearance record; and
providing output identifying the monitored object.

6. An image analysis system according to claim 1, the operations further comprising:
detecting an event, the predetermined time interval being determined based on a time when the detected event occurs.

7. An image analysis system according to claim 6, the operations further comprising:
detecting an abnormal sound detected by a microphone as the event.

8. An image analysis system according to claim 6, the operations further comprising:
detecting smoke detected by a smoke detector as the event.

9. An image analysis system according to claim 6, the operations further comprising:
detecting the event based on information existing on the internet.

10. An image analysis system according to claim 6, the operations further comprising:
predicting the time and place where a crime occurs; and
detecting the predicted time and place as the event.

11. An image analysis system according to claim 6, wherein the predetermined pattern is determined based on a location of the detected event.

* * * * *